United States Patent [19]
Naito

[11] Patent Number: 4,645,719
[45] Date of Patent: Feb. 24, 1987

[54] SOFT MAGNETIC THIN FILM HAVING UNIAXIAL MAGNETIC ANISOTROPY

[75] Inventor: Hiroichi Naito, Kanagawa, Japan

[73] Assignee: Fuji Photo Film Co., Ltd., Kanagawa, Japan

[21] Appl. No.: 621,770

[22] Filed: Jun. 18, 1984

[51] Int. Cl.⁴ ............................................. H01G 1/00
[52] U.S. Cl. ................................. 428/626; 428/928; 427/132; 204/192.2
[58] Field of Search ............................ 428/626, 928; 204/192 M

[56] References Cited

U.S. PATENT DOCUMENTS

| | | | |
|---|---|---|---|
| 3,866,288 | 2/1975 | Bernard et al. | 428/626 |
| 4,293,621 | 10/1981 | Togami | 428/928 |
| 4,371,590 | 2/1983 | Izumi et al. | 428/928 |
| 4,395,465 | 7/1983 | Takagi et al. | 428/626 |
| 4,410,603 | 10/1983 | Yamamori et al. | 428/928 |
| 4,452,864 | 6/1984 | Kitahara et al. | 428/928 |

FOREIGN PATENT DOCUMENTS

| | | | |
|---|---|---|---|
| 557019 | 5/1958 | Canada | 428/928 |
| 882810 | 11/1961 | United Kingdom | 428/928 |

Primary Examiner—Veronica O'Keefe
Attorney, Agent, or Firm—Sughrue, Mion, Zinn, Macpeak & Seas

[57] ABSTRACT

A magnetic device comprised of a soft magnetic thin film having uniaxial magnetic anastropy is achieved by depositing a first permalloy material on a substrate in a pattern having a plurality of small rectangular elements each of which will function as a small bar magnet due to shape anisotropy and depositing a second permalloy film over the remainder of the substrate which will have uniaxial anisotropy due to the magnetic field of each small bar magnet.

1 Claim, 15 Drawing Figures

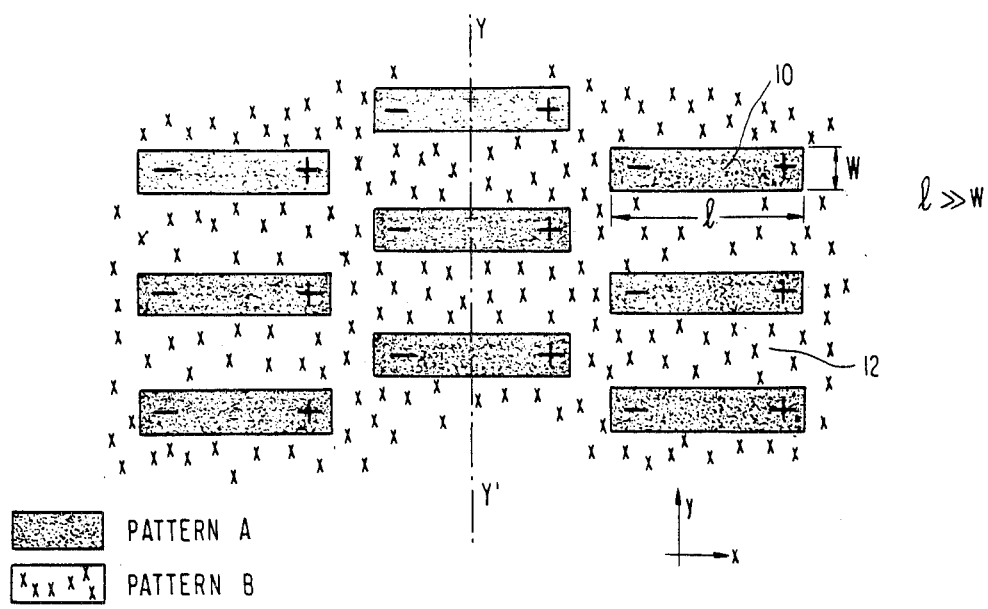
FIG. 1
PATTERN A
PATTERN B
$\ell \gg W$
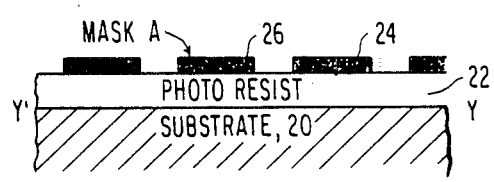
FIG. 2a — MASK A
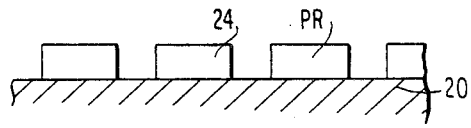
FIG. 2b — EXPOSURE & DEVELOP.
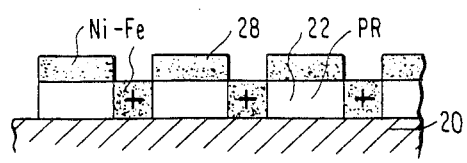
FIG. 2c — 1st DEPOSITION OF Ni-Fe
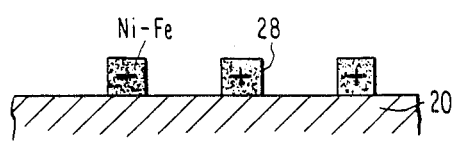
FIG. 2d — PR REMOVE
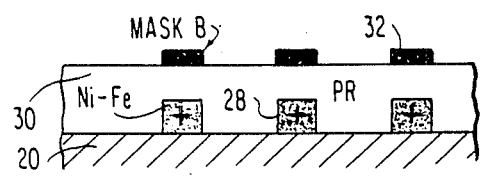
FIG. 2e — PR COAT & MASK B
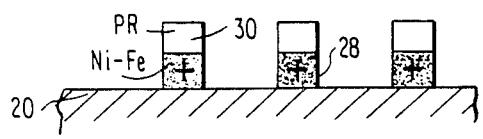
FIG. 2f — EXPOSURE & DEVELOP.
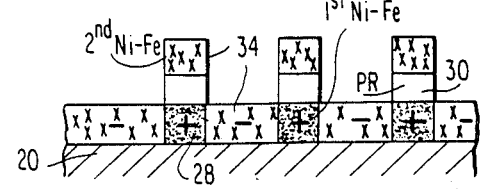
FIG. 2g — 2nd DEPOSITION OF Ni-Fe
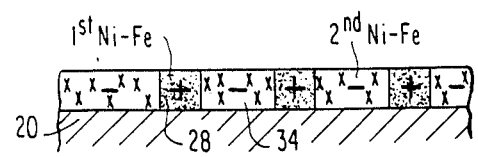
FIG. 2h — PR REMOVE 1st DEPOSITION OF Ni-Fe

PR COAT & MASK B

EXPOSURE & DEVELOP.

MILL Ni-Fe

2nd DEPOSITION OF Ni-Fe

PR REMOVE

SOFT MAGNETIC THIN FILM HAVING UNIAXIAL MAGNETIC ANISOTROPY

The present invention is directed to a soft magnetic thin film having uniaxial magnetic anisotropy and the method for producing such a film, and more specifically to a method for producing the uniaxial magnetic anisotropy in the soft magnetic film by the use of shape magnetic anisotropy.

In making a magnetic head having a thin magnetic film, it is necessary to have uniaxial anisotropy in a specific direction. Such a thin film magnetic head has an easy axis along which the magnetic material may be easily aligned and it is necessary that the easy axis be parallel to the tape and perpendicular to the direction of tape movement past the head. Thus, the easy axis will also be perpendicular to the magnetic axis due to the driving force of the coil associated with the magnetic head.

According to the prior art, in order to make uniaxial magnetic anisotropy in a thin film it was necessary to deposit a magnetic material on the substrate through an external magnetic field which was homogeneous over the entire substrate during the deposition. In order to provide such an external magnetic field, it was necessary to utilize a pair of relatively large Helmholtz coils.

Another prior art method involved utilizing the crystallographic anisotropy of the substrate. Furthermore, a Ni-Fe alloy must be used having a composition which makes the magnetostriction contrast $\lambda < 0$ (or $\lambda > 0$).

SUMMARY OF THE INVENTION

The present invention provides a new and improved soft magnetic thin film having uniaxial magnetic anisotropy produced by a method which does not require either a Helmholtz coil or a substrate having crystallographic anisotropy.

The present invention provides a new and improved soft magnetic thin film having uniaxial magnetic anisotropy comprised of a first deposited permalloy arranged in a pattern having a plurality of small rectangular elements each of which will function as a small bar magnet due to shape anisotropy and a second permalloy film covering the remainder of the substrate and having uniaxial anisotropy due to the magnetic field of each small bar magnet of the first deposited permalloy film. The method of forming the first and second permalloy films is carried out using conventional photoresist and milling techniques.

The foregoing and other objects, features and advantages of the invention will be apparent from the following more particular description of preferred embodiments of the invention as illustrated in the drawings.

BRIEF DESCRIPTION OF THE DRAWINGS

FIG. 1 is a schematic view showing a portion of the soft magnetic thin film comprised of a first permalloy material in the form of spaced bar magnets and a second permalloy film covering the remainder of the surface.

FIGS. 2(a)-2(h) consists of a plurality of schematic views showing the sequential method steps according to a first embodiment.

DETAILED DESCRIPTION OF THE INVENTION

Figure 3A:
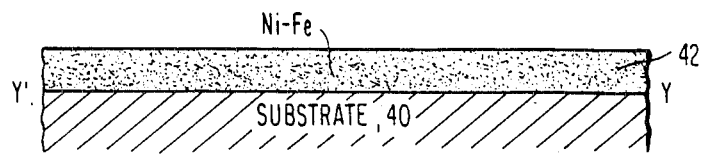
FIGS. 3(a)-3(f) show a plurality of schematic views showing the sequential method steps according to a second embodiment.

The present invention is directed to a method for obtaining uniaxial magnetic anisotropy in a permalloy film as shown in FIG. 1 by using the effect of the shape magnetic anisotropy. A first permalloy material 10 is deposited on the substrate in the form of a plurality of parallel spaced apart small rectangular elements located in a plurality of columns with the elements in adjacent columns being offset from each other. Each of the small rectangular elements functions as a small bar magnet due to shape anistropy. The width W of each small rectangular element has to be small enough in order not to form magnetic domains and the length L is considerably greater than the width W. A second permalloy material 12 is then deposited over the remainder of the substrate surface. The second permalloy film will come to have uniaxial anistropy in the X axis direction as shown in FIG. 1 due to the magnetic field of each small bar magnet 10. The magnetic field vectors will only have a component in the X direction since the Y components will be cancelled with respect to each other. Therefore, the obtained uniaxial anistrophy of the second permalloy material will be oriented in the X-direction and the magnitude of this anistropy is capable of being controlled by controlling the substrate temperature during deposition. In order to achieve the foregoing film having uniaxial magnetic anistropy two methods can be considered.

According to the first method, a substrate 20 is coated with a photo resist 22 and a mask 24 having a plurality of small rectangular apertures 26 arranged in the desired pattern is placed over the photoresist 22, as shown in FIG. 2(a). The photoresist material is then exposed and developed to arrive at the configuration shown in FIG. 2(b). The first permalloy film 28 is then deposited on the substrate 20 and the patterned photoresist material 22, as shown in FIG. 2(c). The photoresist is then removed by conventional means leaving a pattern of small rectangular bars of the first magnetic material 28 on the substrate 20, as shown in FIG. 2(d). As mentioned previously, the small rectangular bars of material will be individual bar magnets due to shape anisotropy.

The substrate 20 having the plurality of small bar magnets thereon is then covered with a photoresist coating 30 and a second mask 32, having the same configuration as the bar magnets, is placed on top of the photoresist over each bar magnet 28, as shown in FIG. 2(e). The photoresist material is then exposed and developed by conventional means to achieve the configuration shown in FIG. 2(f). The second film of permalloy material 34 is then deposited on the photoresist material and the substrate, as shown in FIG. 2(g). Finally, the photoresist is removed by conventional means leaving a substrate 30 having a pattern of small bar magnets 28 of a first permalloy material with the remaining surface area completely coated by the second permalloy material as shown in FIG. 2(h). As mentioned previously, the first deposited permalloy film will have the uniaxial anistropy in the X direction due to the shape anisotropy of the individual rectangular elements during deposition so that the magnitude of the uniaxial anistropy of the second deposited film can be controlled by the substrate temperature during the deposition as well as by the ratio of L to W.

Figure 3B:
Figure 3C:
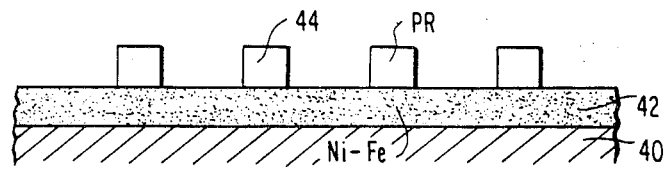
Figure 3D:
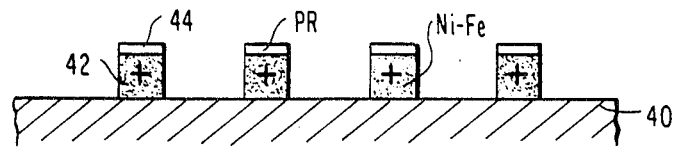

In the second method, the substrate 40 is completely covered by a first thin film of permalloy material 42, as shown in FIG. 3(a). The first permalloy film 42 is completely covered with a layer of photoresist material 44, and a mask 46 comprising a plurality of small rectangular elements is placed on the photoresist material, as shown in FIG. 3(b). The photoresist material is then exposed and developed according to a conventional process to provide a plurality of small rectangular elements of photoresist material 44 on the first permalloy film 42 as shown in FIG. 3(c). The first permalloy film is then milled by a conventional means to form a plurality of small rectangular elements of the first permalloy material which will act as small bar magnets due to shape anistropy, as shown in FIG. 3(d).

Figure 3E:
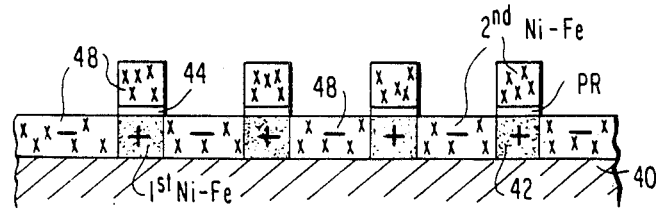
Figure 3F:
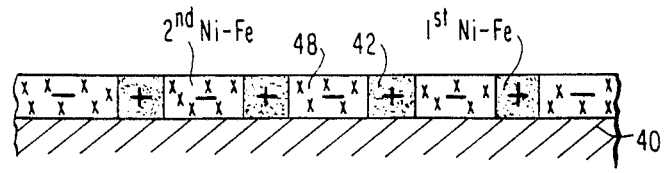

A second permalloy film 48 is then deposited on the photoresist material 44 and the substrate 40, as shown in FIG. 3(e). The photoresist material is then removed, leaving the substrate 40 with a plurality of small bar magnets 42 of the first permalloy material 42 and the remainder of the surface of the substrate covered by the second permalloy material 48 as shown in FIG. 3(f). As pointed out previously, the first permalloy film will come to have uniaxial anistropy in the X direction due to shape anistropy after the small rectangular elements have been shaped by milling. Consequently, the magnitude of the uniaxial anistropy of the deposited film will be determined only by the ratio of L to W.

Thus, the present invention provides a soft magnetic thin film having uniaxial magnetic anistropy which can be very homogenous for both magnitude and orientation in a desired direction. Furthermore, in the method of producing such a film, no external magnetic field is needed to achieve uniaxial anistropy.

While the invention has been particularly shown and described with reference to preferred embodiments thereof, it will be understood by those in the art that various changes in form and details may be made therein without departing from the spirit and scope of the invention.

What is claimed is:

1. A magnetic device comprising a substrate, a first thin film of a first permalloy material disposed on said substrate in the form of a plurality of small rectangular elements disposed in spaced parallel relation to each other in a uniform pattern to provide a plurality of small bar magnets due to shape anisotropy and a second film of a second permalloy material covering the remaining portion of said substrate and having uniaxial anistropy due to the shape anistropy of the small rectangular elements.

* * * * *